(12) United States Patent
Vitale et al.

(10) Patent No.: US 8,132,982 B2
(45) Date of Patent: Mar. 13, 2012

(54) DUST SUPPRESSION AGENT

(75) Inventors: Robert W. Vitale, Canton, OH (US); Cheryl L. Detloff, Canton, OH (US); Daniel A. Thomson, Akron, OH (US)

(73) Assignee: Midwest Industrial Supply, Inc., Canton, OH (US)

( * ) Notice: Subject to any disclaimer, the term of this patent is extended or adjusted under 35 U.S.C. 154(b) by 0 days.

(21) Appl. No.: 13/193,680

(22) Filed: Jul. 29, 2011

(65) Prior Publication Data

US 2011/0280658 A1 Nov. 17, 2011

Related U.S. Application Data

(63) Continuation of application No. 12/779,897, filed on May 13, 2010, which is a continuation-in-part of application No. 12/729,683, filed on Mar. 23, 2010, now Pat. No. 8,033,750.

(60) Provisional application No. 61/177,749, filed on May 13, 2009, provisional application No. 61/234,388, filed on Aug. 17, 2009, provisional application No. 61/309,223, filed on Mar. 29, 2010, provisional application No. 61/165,235, filed on Mar. 31, 2009, provisional application No. 61/169,041, filed on Apr. 14, 2009.

(51) Int. Cl.
*C08K 3/34* (2006.01)
*E01C 7/36* (2006.01)
(52) U.S. Cl. ............ 404/76; 404/75; 252/88.1; 524/445
(58) Field of Classification Search .................. 404/72, 404/75, 76; 252/88.1; 524/445
See application file for complete search history.

(56) References Cited

U.S. PATENT DOCUMENTS

| | | | |
|---|---|---|---|
| 3,640,696 A | 2/1972 | Goldmann | |
| 3,651,649 A | 3/1972 | Najvar et al. | |
| 3,690,107 A | 9/1972 | Dolfing et al. | |
| 3,705,467 A | 12/1972 | McKnight | |
| 3,817,643 A * | 6/1974 | Azar et al. | ...... 404/76 |
| 3,887,506 A | 6/1975 | Hewitt | |
| 4,106,296 A | 8/1978 | Leonard, Jr. et al. | |
| 4,129,435 A | 12/1978 | Takematsu et al. | |
| 4,218,234 A | 8/1980 | Nadasy et al. | |
| 4,252,556 A | 2/1981 | Nadasy et al. | |
| 4,268,428 A | 5/1981 | Green | |
| 4,417,992 A | 11/1983 | Bhattacharyya et al. | |
| 4,592,931 A | 6/1986 | Cargle | |
| 4,650,820 A | 3/1987 | Decroix | |
| 4,822,425 A | 4/1989 | Burch | |
| 5,013,349 A | 5/1991 | Tanaka | |

(Continued)

FOREIGN PATENT DOCUMENTS

EP 0 467 073 1/1992

(Continued)

OTHER PUBLICATIONS

Rohmax Additives GmbH, "Viscoplex 1-180," Data Sheet, Jul. 2004, www.rohmax.com.

(Continued)

*Primary Examiner* — Raymond Addie
(74) *Attorney, Agent, or Firm* — Daniel A. Thomson; Emerson Thomson Bennett, LLC

(57) ABSTRACT

A composition for dust suppression including an acrylic polymer, a polyvinyl acetate polymer, glycerin, and water is herein disclosed.

18 Claims, 7 Drawing Sheets

U.S. PATENT DOCUMENTS

| | | | |
|---|---|---|---|
| 5,082,500 | A | 1/1992 | Nachtman et al. |
| 5,112,902 | A | 5/1992 | Moriya et al. |
| 5,178,668 | A | 1/1993 | Traver et al. |
| 5,595,782 | A | 1/1997 | Cole |
| 5,648,116 | A | 7/1997 | Roe et al. |
| 5,712,316 | A | 1/1998 | Dahmen et al. |
| 5,733,576 | A | 3/1998 | Chmelir |
| 5,824,725 | A | 10/1998 | Lahalih |
| 5,846,601 | A | 12/1998 | Ritter et al. |
| 5,860,770 | A | 1/1999 | Hunt |
| 5,997,599 | A | 12/1999 | Wommack et al. |
| 6,060,557 | A | 5/2000 | Dahmen et al. |
| 6,076,997 | A | 6/2000 | First et al. |
| 6,132,638 | A | 10/2000 | Oldenhove |
| 6,325,836 | B1 | 12/2001 | Wommack et al. |
| 6,349,499 | B1 | 2/2002 | Spittle |
| 6,403,700 | B1 | 6/2002 | Dahmen et al. |
| 6,503,521 | B1 | 1/2003 | Atis |
| 6,695,545 | B2 | 2/2004 | Boston |
| 6,729,805 | B2 | 5/2004 | Wathen |
| 6,750,262 | B1 | 6/2004 | Hahnle et al. |
| 6,759,453 | B2 | 7/2004 | Jelling et al. |
| 6,982,291 | B2 | 1/2006 | Desin |
| 7,001,444 | B2 | 2/2006 | Small |
| 7,026,390 | B2 | 4/2006 | O'Brien-Bernini et al. |
| 7,070,709 | B2 | 7/2006 | Schilling et al. |
| 7,074,266 | B2 | 7/2006 | Hawkins et al. |
| 7,134,806 | B2 | 11/2006 | Lazic |
| 7,207,744 | B2 | 4/2007 | Jones, IV et al. |
| 7,285,515 | B2 | 10/2007 | Goncalves et al. |
| 7,514,018 | B2 | 4/2009 | Schilling et al. |
| 7,651,294 | B2 | 1/2010 | Maier |
| 2004/0011102 | A1 | 1/2004 | Sears |
| 2004/0035162 | A1 | 2/2004 | Williams et al. |
| 2004/0074271 | A1 | 4/2004 | Krysiak et al. |
| 2004/0234682 | A1 | 11/2004 | Hawkins et al. |
| 2004/0245494 | A1 | 12/2004 | Horman et al. |
| 2004/0260017 | A1 | 12/2004 | Mertens et al. |
| 2005/0090401 | A1 | 4/2005 | Sakane et al. |
| 2005/0124527 | A1 | 6/2005 | Hawkins et al. |
| 2005/0150417 | A1 | 7/2005 | Hirsbrunner et al. |
| 2006/0048670 | A1 | 3/2006 | Al-Rashed |
| 2006/0075928 | A1 | 4/2006 | Richards et al. |
| 2006/0128839 | A1 | 6/2006 | Ferrall et al. |
| 2006/0156961 | A1 | 7/2006 | Langford |
| 2007/0135561 | A1 | 6/2007 | Rath et al. |
| 2007/0286903 | A1 | 12/2007 | Becicka |
| 2008/0028890 | A1 | 2/2008 | Hey et al. |
| 2008/0087305 | A1 | 4/2008 | Cotter |
| 2008/0185160 | A1 | 8/2008 | Diener et al. |
| 2009/0090890 | A1 | 4/2009 | Hguyen |
| 2009/0169901 | A1 | 7/2009 | Blacklidge |
| 2009/0189113 | A1 | 7/2009 | Lamperd et al. |
| 2009/0211491 | A1 | 8/2009 | Ogata et al. |
| 2009/0301302 | A1 | 12/2009 | Weatherman et al. |
| 2009/0301863 | A1 | 12/2009 | Swanson, Jr. et al. |
| 2009/0318602 | A1 | 12/2009 | Deneuvillers |
| 2010/0047015 | A1 | 2/2010 | Takamura et al. |
| 2010/0075029 | A1 | 3/2010 | Wilson, Jr. |
| 2010/0112329 | A1 | 5/2010 | Yi |

FOREIGN PATENT DOCUMENTS

| | | |
|---|---|---|
| EP | 1 112 324 | 10/2005 |
| EP | 2 083 121 | 7/2009 |
| GB | 2 142 552 | 1/1985 |
| JP | 49 7899 | 2/1974 |
| JP | 04 142390 | 5/1992 |
| JP | 07 042210 | 5/1995 |
| JP | 2109781 | 11/1996 |
| KR | 10 2000 0060661 | 10/2000 |
| WO | 00 15715 | 3/2000 |
| WO | 2006 041581 | 4/2006 |
| WO | 2006 068467 | 6/2006 |
| WO | 2008 011368 | 1/2008 |
| WO | 2008 070234 | 6/2008 |
| WO | 2009 137299 | 11/2009 |
| WO | 2010 025518 | 3/2010 |

OTHER PUBLICATIONS

Rohmax Additives GmbH, "Viscoplex 10-131," Data Sheet, Jul. 2004, www.rohmax.com.

Midwest Industrial Supply, Inc., "Envirokleen Gravel Runways Fines Preservation," unknown publication, unknown date, www.midwestind.com.

Midwest Industrial Supply, Inc., "EK35 Gravel Runways Fines Preservation," unknown publication, unknown date, www.midwestind.com.

Geotechnical Laboratory of Advanced Geotechnical Testing AGT, LLC, "Kipnik Soil Evaluation Stabilized Sub-Grade Apron Development," AGT Project No. 3407159, Sep. 2007.

University of Alaska Fairbanks, Hazirbaba, Connor, Davis, Zhang, "Final Report: The Use of Geofiber and Synthetic Fluid for Stabilizing Marginal Soils," INE Project No. RR07.03, Oct. 1, 2007.

Tracey, Tsou, "Dynamically Vulcanized Alloy Innerliners," Rubber World Magazine, ISSN 0035-9572, Sep. 1, 2007.

University of Alaska Fairbanks, Misc. Authors, Newsletter vol. 1, No. 2, Feb. 2008.

Wacker Silicones, "Drysoil in Landscaping Application, Creating Tomorrow's Solutions," Apr. 1, 2008.

Copeland, Eisele, Chesney, Kawatra, "Factors Influencing Dust Suppressant Effectiveness," Minerals & Metallurgical Processing, 25(4): 215-222, Nov. 2008.

Kavouras, Etyemezian, Nikolich, Gilles, Sweeney, Young, Shafer, "A New Technique for Characterizing the Efficacy of Fugitive Dust Suppressants," Journal of the Air & Waste Management Association, 59 (5): 603-612, May 2009.

Edvardsson, "Gravel Roads and Dust Suppression," Road Materials and Pavement Design, 10(3): 439-469, Jul.-Sep. 2009.

Goodrich, Koski, Jacobi, "Monitoring Surface Water Chemistry Near Magnesium Chloride Dust Suppressant Treated Roads in Colorado," Journal of Environmental Quality, 38(6): 2373-2381, Nov.-Dec. 2009.

Marais, Thompson, Visser, "Managing Mine Road Maintenance Interventions Using Mine Truck On-Board Data," The Southern African Institute of Mining and Metallurgy, Surface Mining 2008.

Thompson, Visser, "Mine Haul Road Maintenance Management Systems," unknown publication, unknown date.

Thompson, Visser, Van Den Bert, Bosch, "Towards a Mechanistic Structural Design Method for Surface Mine Haul Roads," Journal of the South African Institution of Civil Engineers, vol. 38, No. 2, Second Quarter 1996, pp. 13-21.

Thompson, Visser, "Mine Haul Road Fugitive Dust Emission and Exposure Characterisation," unknown publication, Jan. 2001.

Thompson, Visser, "Benchmarking and Managing Surface Mine Haul Road Fugitive Dust Emissions," unknown publication, Mar. 2002.

Hugo, Heyns, Thompson, Visser, "Haul Road Condition Monitoring using Vehicle Response Measurements," ICSV, Jul. 2005.

Thompson, Visser, "The Impact of Rolling Resistance on Fuel, Speed and Costs," HME 2006: Continuous Improvement Case Studies, 2006.

Thompson, Visser, "Selection and Maintenance of Mine Haul Road Wearing Course Materials," Mining Technology, 2006, vol. 115, No. 4, pp. 140-153.

Thompson, Visser, "Selection Performance and Economic Evaluation of Dust Palliatives on Surface Mine Haul Roads," The Journal of the Southern African Institute of Mining and Metallurgy, vol. 107, Jul. 2007, pp. 1-16.

Thompson, Visser, "Final Project Report COL467: The Reduction of the Safety and Health Risk Associated with the Generation of Dust on Strip Coal Mine Haul Roads," University Pretoria, Departments of Mining and Civil Engineering, Jan. 2000.

Edil, Benson, "Sustainable Construction Case History: Fly Ash Stabilization of Road-Surface Gravel," University of Wisconsin-Madison, Geological Engineering Program, Dept. of Civil and Environmental Engineering, 2007 World of Coal Ash (WOCA), May 7-10, 2007.

Liu, J., Shi, B., Jiang, H., Bae, S., Huang, H., "Improvement of Water-Stability of Clay Aggregates Admixed with Aqueous Polymer Soil Stabilizers" Catena, vol. 77, Issue 3, Jun. 15, 2009, p. 175-179.

* cited by examiner

“DUST SUPPRESSION AGENT

I. CROSS-REFERENCE TO RELATED APPLICATIONS

This application is a continuation of U.S. Ser. No. 12/779,897, filed May 13, 2010, which is a continuation-in-part of U.S. Ser. No. 12/729,683 filed Mar. 23, 2010 now U.S. Pat. No. 8,033,750, which claims priority to Provisional Patent Application No. 61/177,749 filed May 13, 2009; and Provisional Patent Application No. 61/234,388 filed Aug. 17, 2009; and Provisional Patent Application No. 61/309,223 filed Mar. 29, 2010, all of which are incorporated herein by reference.

U.S. Ser. No. 12/729,683 claims priority to Provisional Patent Application No. 61/165,235 filed Mar. 31, 2009 and Provisional Patent Application No. 61/169,041 filed Apr. 14, 2009, both of which are incorporated herein by reference.

II. BACKGROUND

A. Field

This invention generally relates to methods and compositions for improving the strength and longevity of secondary roadways through environmentally sound practices; specifically, improved dust suppression, soil stabilization, and water repellency.

B. Description of the Related Art

The engineering and construction of secondary roads (hereafter, "gravel roads," "earth roads," or "unpaved roads") has been perpetually plagued by two interrelated problems: the deterioration of the road due to water, and the loss of surface cohesion and road compaction due to traffic. The deleterious effects of water on roadways, in particular, are well documented in the prior art. In cold weather, moisture that penetrates a road's base layers freezes and rips cracks into the road substrate that seriously undermine the load bearing capacity and longevity of the roadway. Likewise, in milder weather, when water seeps into the road's base layers it results in softening and erosion that causes potholes that are an expensive and recurring problem. And if the potholes are not immediately repaired, they fill with water and further exacerbate the deterioration of the roadway.

The impact of water on secondary roads—such as rural roads, access roads, field and forestry roads, or mountain roads—is especially pronounced because the quality of the surfacing materials is lower than in an asphalt paved road, for example, and thus provides reduced surface protection from the elements. Additionally, because of capillary action, water also seeps into the road base from the sides and bottom of the road's base or sub-base. Compared to sealed or "paved" roads, which require large machinery to pour concrete or to lay and smooth a bitumen-based surface, secondary unpaved roads are relatively easy and inexpensive to build. But unpaved roads require much more frequent maintenance—particularly after wet periods or when faced with increased traffic—and are generally prone to other problems not associated with paved roads.

For example, many secondary roads—of either an earth or gravel variety—utilize native soils, often in conjunction with gravel quarried from local resources, to create the road's sub-base and base layers. Unfortunately, native soils and gravel are not always of suitable quality, resulting in a road base with diminished physical and mechanical properties. When secondary roads are constructed of poor road base materials, routine maintenance is not strictly employed, and the road is exposed to heavy moisture and/or traffic, the erosion of the road—due to damage to the road surface, sub-base, and base materials—is hastened.

Defects in road surfaces are typically classified into two categories: surface deterioration and surface deformation. While surface deterioration is related mostly to the quality of the surfacing materials and the way they respond to weather or traffic stresses, surface deformations often have combined causes that include both stresses to the road surface itself and other factors such as sub-base and base capacity and stability.

Surface deterioration is exemplified by "dust," the result of loss of fine binder material from road surfaces. Dust is a substantial problem for secondary roads, as the loss of these fine materials leads to other types of road distress such as loss of cohesion and compaction of the road fill material, and reduced capacity to maintain the requisite moisture in the road fill.

Surface deformations include ruts, corrugations, depressions, and potholes. Ruts are longitudinal depressions in the wheel paths caused by high moisture content, inadequate strength in the subsurface soil or base, inadequate surface course thickness, or heavy traffic loads. Corrugating or "washboarding" is a series of ridges and depressions across the road surface caused by lack of surface cohesion. Depressions are localized low areas one or more inches below the surrounding road surfaces that are caused by settlement, excessive moisture content, and/or improper drainage. Potholes are small depressions or voids in the road surface one or more inches deep which are caused by excessive moisture content, poor drainage, weak sub-base or base, poorly graded aggregate, or a combination of these factors.

As such, the problems typically associated with secondary roads—both surface deterioration and deformation—are caused by: 1) the harmful effects of water and high moisture content, including settlement and erosion, on the road surface and base, 2) the lack of surface cohesion and resulting loss of road compaction caused by dust, and 3) the heavy traffic loads exerted on roads with weak or inadequate soil, sub-base, or base.

Industry has provided for the addition of various chemical additives to impart water repellency on road materials, with varying degrees of success and environmental impact. However, water repellant chemicals are not binders, and load bearing capacity and stability are not improved by their application to the soil or road base. In many cases, dust can also be reduced on gravel roads by applying chemical additives (commonly known in the art as "dust suppressors" or "dust retardants") which draw moisture from the air to improve fine aggregate cohesion. And "soil stabilizers," which are chemicals designed to act as binders and coalesce forming bonds between the soil or aggregate particles, have shown promise in greatly improving the load bearing and traffic capacity of the road. But existing soil stabilizers and dust retardants are difficult to apply and use in cold climates, tend to have long cure times, short life-cycles, and do not provide the requisite protection against water damage; particularly excessive moisture content resulting from capillary action.

Therefore, a chemical composition capable of resisting the aforementioned problems—by providing water repellency for reduced moisture content, dust retardant for improved surface cohesion, and soil stabilizers for improved load bearing and traffic capacity—would be of great utility in the field of art; particularly if the chemical composition could be applied in an economical and environmentally sound manner. Although road builders have long employed soil additives as a mechanism for preventing and avoiding surface deteriorations and deformations, formulating a combination of chemicals and a methodology for applying the chemical additives in a cost-effective manner has proved elusive. Specifically, although various chemicals have been provided for binding road base materials together for improved strength and load bearing capacity and for repelling water from the road surface, previous efforts have thus far failed to provide an environmentally appropriate solution to the secondary road erosion and maintenance issues that have long plagued the art. Thus, there is a need in the art for improved compositions that provide extraordinary increases in load bearing capacity, outstanding dust retardant capabilities, superior water repellant properties, and can be administered in a single application phase. Such an improved composition could provide an engineered stabilized water repellant road base and surface topping for earth or gravel roads; or, it could prepare a road sub-base or base for chip sealing, paving, or milling applications.

Repairing damaged roadways by conventional methods can be extremely expensive, time consuming, and environmentally disruptive because the entire compacted gravel layer of the road must be replaced. Excavating the roadbed of a 1-km portion of road measuring 4 m in width produces about 2000 cubic meters ($m^3$) of earthy waste; in a conventional road bed repair project, this would require roughly 220 truckloads of waste to be removed from the worksite, with 220 truckloads of new gravel being shipped back the worksite to complete the project. In isolated locations, or locations with difficult terrain, the expense of removing and later replacing the gravel is exorbitant—as is the impact on local residents (who must cope with noise and air pollution), normal users of the roadway (who experience detours or extended delays during repair), and the landfills that store the removed waste.

As a result, there is a need in the art for a single phase chemical treatment method that incorporates soil stabilization, dust retardant, and water repellant chemicals into native soils. With such a single phase treatment option, road builders will be able improve the longevity of the roadway, impart increased load bearing and traffic capacity, and reduce the time, costs, and environmental impact associated with conventional road repair projects.

III. BRIEF DESCRIPTION OF THE DRAWINGS

At least one embodiment of the invention is set forth in the following description and is shown in the drawings and is particularly and distinctly pointed out and set forth in the appended claims.

IV. SUMMARY

Figure 1:
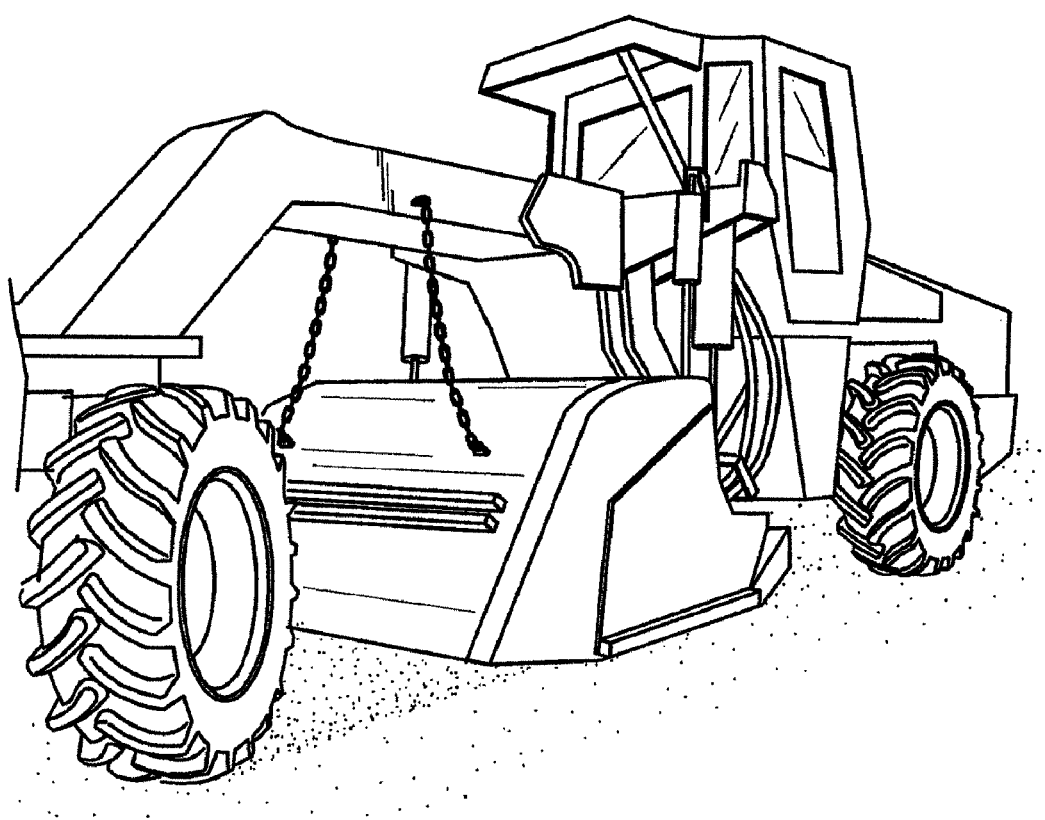
FIG. 1 shows a pulvimixer.

Accordingly, several objects and advantages of the present invention are the provision of a single chemical soil or road base material improvement composition that imparts extraordinary dust control, soil stabilization, and water repellency properties onto native soils or other road base materials.

Additionally, the present invention provides a method for a single application phase treatment of soil or road base materials characterized by reduced cure time, decreased road construction time, reduced environmental impact (by virtue of reduced construction waste and traffic), a wider range of effective application and use temperatures, a long life cycle, and a stronger more dust resistant roadway.

Other benefits and advantages will become apparent to those skilled in the art to which it pertains upon reading and understanding of the following detailed specification.

V. DETAILED DESCRIPTION

In one embodiment of the present invention, a composition for improving the properties of soil or other road base materials is provided. Specifically, a blended mixture of the chemical composition detailed below is capable of improving the dust retardant, water repellant, and soil stabilization properties of soil or other road base materials. Incorporating the chemical improvement composition into soil, or other road base materials, and then compacting, provides superior resistance to surface deformations and deterioration by increasing the load-bearing strength—in some cases, as much as 500%—of the roadway, greatly reducing dust caused by traffic or weather, and eliminating capillary water uptake that results in moisture damage to the road. This invention is an improvement over traditional methods because it provides a composition that can be applied in a single application phase, under a wide range of ambient temperatures and conditions, to resolve all of the above problems in the field of art.

In one embodiment of the present invention, the characteristics of the composition for chemical improvement of soil or road base materials can include a dust suppression and/or soil stabilization composition that is an aqueous emulsion comprising about 0% to about 50% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50) of acrylic polymer, about 0% to about 50% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50) of polyvinyl acetate polymer, about 0% to about 50% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50) glycerin, and about 50% to about 95% by weight (including, but not limited to, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) of water.

In another embodiment of the present invention, the characteristics of the composition for chemical improvement of soil or road base materials can include a dust suppression and/or soil stabilization composition that is an aqueous emulsion comprising about 0% to about 25% by weight (including, but not limited to, 0, 1, 2, 3, 4, 5, 6, 7, 8, 9, 10, 11, 12, 13, 14, 15, 16, 17, 18, 19, 20, 21, 22, 23, 24, and 25) of acrylic polymer, about 0% to about 25% by weight (including, but not limited to, 0, 1, 2, 3, 4, 5, 6, 7, 8, 9, 10, 11, 12, 13, 14, 15, 16, 17, 18, 19, 20, 21, 22, 23, 24, and 25) of polyvinyl acetate polymer, about 0% to about 50% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50) glycerin, and about 30% to about 95% by weight (including, but not limited to, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) of water.

In another embodiment of the present invention, the characteristics of the composition for chemical improvement of soil or road base materials can include a dust suppression and/or soil stabilization composition that is an aqueous emulsion comprising about 0% to about 20% by weight (including, but not limited to, 0, 1, 2, 3, 4, 5, 6, 7, 8, 9, 10, 11, 12, 13, 14, 15, 16, 17, 18, 19, and 20) of acrylic polymer, about 0% to about 20% by weight (including, but not limited to, 0, 1, 2, 3, 4, 5, 6, 7, 8, 9, 10, 11, 12, 13, 14, 15, 16, 17, 18, 19, and 20) of polyvinyl acetate polymer, about 40% to about 99% by weight (including, but not limited to, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, and 99) glycerin, and about 0% to about 40% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40) of water.

In another embodiment, wherein the temperatures will be above freezing, the composition for chemical improvement of soil or road base materials is comprised of an aqueous solution of a water repellant in combination with an aqueous emulsion of a soil stabilizer and dust retardant. In one embodiment of the present invention, the characteristics of the composition for chemical improvement of soil or road base materials can include an aqueous solution of a water repellant that comprises about 1.0% to about 5.0% by weight (including, but not limited to, 1, 2, 3, 4, and 5) of potassium hydroxide; about 10.0% to about 30.0% by weight (including, but not limited to, 10, 11, 12, 13, 14, 15, 16, 17, 18, 19, 20, 21, 22, 23, 24, 25, 26, 27, 28, 29, and 30) of potassium methylsiliconate; and about 65.0% to about 89.0% by weight (including, but not limited to, 65, 66, 67, 68, 69, 70, 71, 72, 73, 74, 75, 76, 77, 78, 79, 80, 81, 82, 83, 84, 85, 86, 87, 88, and 89) of water. In yet another embodiment of the invention, instead of the aforementioned potassium methylsiliconate, the aqueous solution of a water repellant comprises about 10.0% to about 30.0% by weight (including, but not limited to, 10, 11, 12, 13, 14, 15, 16, 17, 18, 19, 20, 21, 22, 23, 24, 25, 26, 27, 28, 29, and 30) of sodium methylsiliconate.

In one embodiment of the present invention, the characteristics of the composition for chemical improvement of soil or road base materials can include a dust suppression and/or soil stabilization composition that is an aqueous emulsion comprising about 5.0% to about 60.0% by weight (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60) of polyacrylic acid and polyvinyl acetate and 40.0% to about 95.0% by weight (including, but not limited to, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, and 95) of water. It is to be understood that this embodiment could consist of straight acrylic, straight polyvinyl acetate or an SBR (styrene butadiene rubber), all in blends, copolymers, or homopolymers.

In a different embodiment of the present invention, the characteristics of the composition for chemical improvement of soil or road base materials can include a dust suppression and/or soil stabilization composition that is an aqueous emulsion comprising about 0.1% to about 20.0% by weight (including, but not limited to, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 11, 12, 13, 14, 15, 16, 17, 18, 19, and 20) of acrylic polymer and polyvinyl acetate polymer; about 40.0% to about 99.8% by weight (including, but not limited to, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99.0, 99.1, 99.2, 99.3, 99.4, 99.5, 99.6, 99.7, 99.8) of glycerin; and about 0.1% to about 40.0% by weight (including, but not limited to, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40) of water.

In another embodiment of the invention, the composition for chemical improvement of soil or road base materials can comprise about 2.5% to about 30.0% by weight (including, but not limited to, 2.5, 2.6, 2.7, 2.8, 2.9, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 11, 12, 13, 14, 15, 16, 17, 18, 19, 20, 21, 22, 23, 24, 25, 26, 27, 28, 29, and 30) of polyacrylic acid and polyvinyl acetate polymer; about 0.5% to about 2.5% by weight (including, but not limited to, 0.5, 0.6, 0.7, 0.8, 0.9, 1.1, 1.2, 1.3, 1.4, 1.5, 1.6, 1.7, 1.8, 1.9, 2.0, 2.1, 2.2, 2.3, 2.4, and 2.5) of potassium hydroxide; about 5.0% to about 15.0% by weight (including, but not limited to, 5, 6, 7, 8, 9, 10, 11, 12, 13, 14, and 15) of potassium methylsiliconate; and about 52.5% to about 92.0% by weight (including, but not limited to, 52.5, 52.6, 52.7, 52.8, 52.9, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, and 92) of water.

In yet another embodiment of the invention, the composition for chemical improvement of soil or road base materials can comprise about 3.75% to about 45.0% by weight (including, but not limited to, 3.75, 3.76, 3.77, 3.78, 3.79, 3.8, 3.9, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, and 45) of polyacrylic acid and polyvinyl acetate polymer; about 0.25% to about 1.25% by weight (including, but not limited to, 0.25, 0.26, 0.27, 0.28, 0.29, 0.3, 0.4, 0.5, 0.6, 0.7, 0.8, 0.9, 1.0, 1.1, 1.2, 1.21, 1.22, 1.23, 1.24, and 1.25) of potassium hydroxide; about 2.5% to about 7.5% by weight (including, but not limited to, 2.5, 2.6, 2.7, 2.8, 2.9, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, and 7.5) of potassium methylsiliconate; and about 46.25% to about 93.5% by weight (including, but not limited to, 46.25, 46.26, 46.27, 46.28, 46.29, 46.3, 46.4, 46.5, 46.6, 46.7, 46.8, 46.9, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93.0, 93.1, 93.2, 93.3, 93.4, and 93.5) of water.

In still another embodiment of the invention, the composition for chemical improvement of soil or road base materials can comprise about 1.25% to about 15.0% by weight (including, but not limited to, 1.25, 1.26, 1.27, 1.28, 1.29, 1.3, 1.4, 1.5, 1.6, 1.7, 1.8, 1.9, 2, 3, 4, 5, 6, 7, 8, 9, 10, 11, 12, 13, 14, and 15) of polyacrylic acid and polyvinyl acetate polymer; about 0.75% to about 3.75% by weight (including, but not limited to, 0.75, 0.76, 0.77, 0.78, 0.79, 0.8, 0.9, 1, 2, 3, 3.1, 3.2, 3.3, 3.4, 3.5, 3.6, 3.70, 3.71, 3.72, 3.73, 3.74, and 3.75) of potassium hydroxide; about 7.5% to about 22.5% by weight (including, but not limited to, 7.5, 7.6, 7.7, 7.8, 7.9, 8, 9, 10, 11, 12, 13, 14, 15, 16, 17, 18, 19, 20, 21, 22.0, 22.1, 22.2, 22.3, 22.4, and 22.5) of potassium methylsiliconate; and about 58.75% to about 90.5% by weight (including, but not limited to, 58.75, 58.76, 58.77, 58.78, 58.79, 58.8, 58.9, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90.0, 90.1, 90.2, 90.3, 90.4, and 90.5) of water. It is to be understood that this embodiment could comprise mixtures, copolymers, or homopolymers of acrylics, polyvinyl acetates, styrene butadiene rubbers, and styrene acrylics.

In still other embodiments of the present invention, the dust suppression and/or soil stabilization portion of the composition can also include an emulsifier. Furthermore, in certain embodiments of the invention, the polyacrylic acid and/or polyvinyl acetate can comprise a mixture of homopolymers, or can comprise one or more copolymers. Some embodiments may include styrene butadiene rubber and related compositions, copolymers, and/or derivatives thereof. The chemical compositions described above are manufactured using conventional manufacturing equipment. Conventional mixers, emulsifiers, or colloid mills are utilized to blend these components into stable heterogeneous mixers or emulsions.

According to embodiments where the polyacrylic acid and/or polyvinyl acetate components comprise homopolymers, the homopolymer components can be present in ratios from about 1:1 to about 1:10,000 by mass of polyacrylic acid to polyvinyl acetate; or, from about 1:1 to about 1:10,000 by mass of polyvinyl acetate to polyacrylic acid.

According to embodiments where the polyacrylic acid and/or polyvinyl acetate components comprise one or more copolymers, the copolymers can comprise random copolymers, block copolymers, graft copolymers and the like or any combination thereof. Furthermore, the ratio of acrylic acid units to vinyl acetate units within a copolymer can comprise from about 1:1 to about 1:10,000 by mass of acrylic acid units to vinyl acetate units; or, from about 1:1 to about 1:10,000 by mass of vinyl acetate units to acrylic acid units.

Regardless of whether the embodiment comprises homopolymers and/or copolymers, each polymer component can be present in a wide variety of molecular weights and polydispersities thereof. For instance, suitable molecular weight ranges can comprise from about $10^3$ to about $10^4$ g/mol, from about $10^4$ to about $10^5$ g/mol, from about $10^5$ to about $10^6$ g/mol, from about $10^6$ to about $10^7$ g/mol, from about $10^7$ to about $10^8$ g/mol, from about $10^8$ to about $10^9$ g/mol, or even from about $10^9$ to about $10^{10}$ g/mol. Here, as elsewhere in the specification and claims, ranges may be combined. Furthermore, the foregoing molecular weight ranges can be calculated according to any method known in the art including, without limitation, weight average molecular weight and number average molecular weight. One of skill in the art will recognize that the numerical value of a polymer molecular weight differs according to the calculation method.

A composition according to the aforementioned embodiments can comprise a dust suppression, soil stabilization, and/or water repellant composition that can, for instance, be applied to unpaved road surfaces (either soil, earth, dirt, gravel, or other conventional aggregate substances). Such compositions may decrease the amount of dust caused by wind erosion or generated by vehicles operating on the unpaved surface. Other embodiments can alternatively or additionally comprise a soil stabilization composition that increases the California Bearing Ratio (CBR value) and R-value of the soil or road base. In still other embodiments, the composition can alternatively or additionally comprise a water repellant component that eliminates, or greatly reduces, capillary water uptake into road surfaces, bases, and sub-bases. Accordingly, such compositions can increase the weight-bearing capacity of an unpaved road surface, prevent erosion thereof, prevent water uptake thereof, or otherwise enhance the mechanical characteristics of the soil to which it is applied.

In several embodiments of the present invention, methods for improving soil or road base materials are provided. In one embodiment, a heterogeneous mixture of an aqueous solution of a water repellant and aqueous emulsion of a soil stabilizer and dust retardant—according to the various chemical embodiments described above—is provided and applied to soil or road base materials (thereafter, "treated soil or road base materials"). As used in this patent application, the term "soil" is broadly used to describe the top layer of the earth's surface, consisting of rock and mineral particles mixed with organic matter (also known as, by non-limiting reference, earth or dirt); whether originally located at the road construction site ("native soil" or "in situ soil") or transported to the road construction site. As used in this patent application, the phrase "road base materials" is broadly used to describe any substance from which a road surface, base, or sub-base could be constructed; including, but certainly not limited to by this non-limiting reference, rock, broken rock, gravel (whether pebble, granule, or other size or mixture), sand, cobble, slag, or other construction aggregate or fill material. In these embodiments, the material being treated is graded prior to application. Soil high in organic matter, because it is not cohesive, creates some difficulties establishing the reaction necessary to render the soil hydrophobic. The manner of composition application can include any method chosen with sound engineering judgment; but in most instances, application of the chemical agent to the soil is accomplished by the use of conventional spray equipment (spray trucks). The agent is gravity fed or pumped through hoses, spray nozzles, or fixed sprayers and evenly applied to the soil or material to be treated.

In some embodiments of the invention, the soil or road base materials are scarified (ripped open)—preferably to a depth of about 4-6 inches—by conventional road construction graders (particularly graders with rake attachments) prior to application of the soil or road base material chemical improvement composition. This has the effect of allowing the composition to penetrate and permeate the soil or road base material to a greater degree. Once applied, the composition penetrates into the soil or road base materials where particle weighting and loading mechanisms achieved through the processes of adsorption, prompt adherence of molecules to the surface of particles and absorption and penetration of the substance into the inner structure of the particles. The water repellant portion of the composition reacts with minerals in the soil or road base materials and rapidly forms a hydrophobic silicone resin network that does not close pores in the substances, but rather permits the road to "breathe" in spite of water repellant properties. During the inventive process, evaporation of water occurs. The polymers of the aqueous acrylic polymer emulsion coalesce and form an intimate bond with the soil upon evaporation of the water. The sodium silicate and potassium silicate in water uses cohesion of the soil particles to form discrete hydrophobic silicone networks.

In one embodiment of the invention, the treated soil or road base materials are graded and compacted, using any means chosen with sound engineering judgment, and a top coat of the composition is applied. Motor-graders, asphalt grinders, mixers, pug mills, compactors, rollers, and other conventional construction equipment may be utilized to blend, set grade, and compact stabilized base, if necessary, as described in herein. A top coat is defined broadly as any application of the soil or road base materials chemical improvement composition that is applied after compaction.

Figure 2:
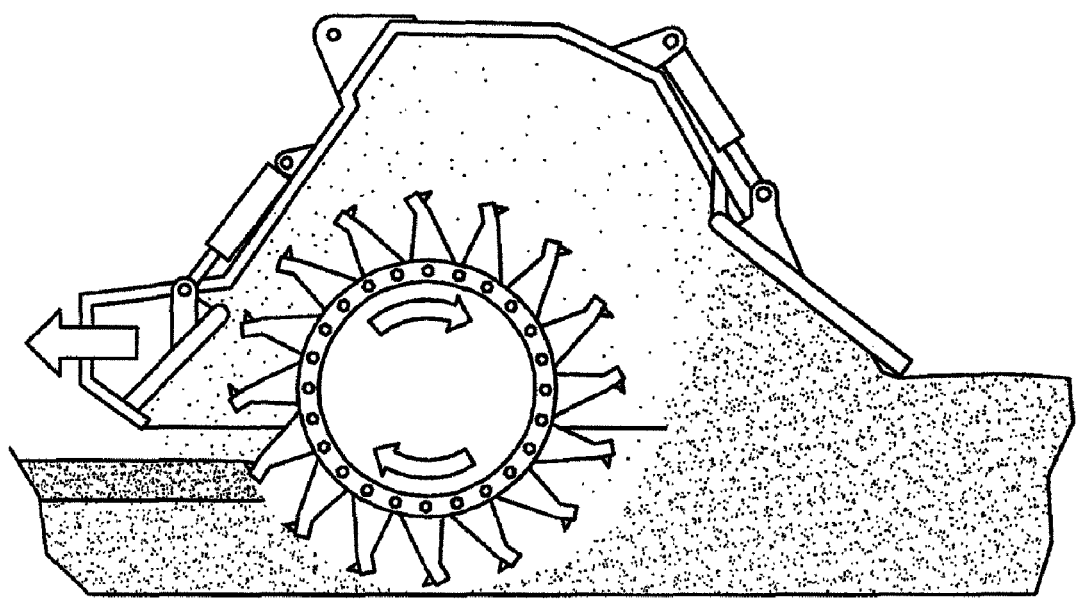
FIG. 2 shows a side view of the pulvimixer, wherein the soil or road base materials are being pulverized, sprayed, and mixed with the chemical composition of the present invention.
Figure 3:
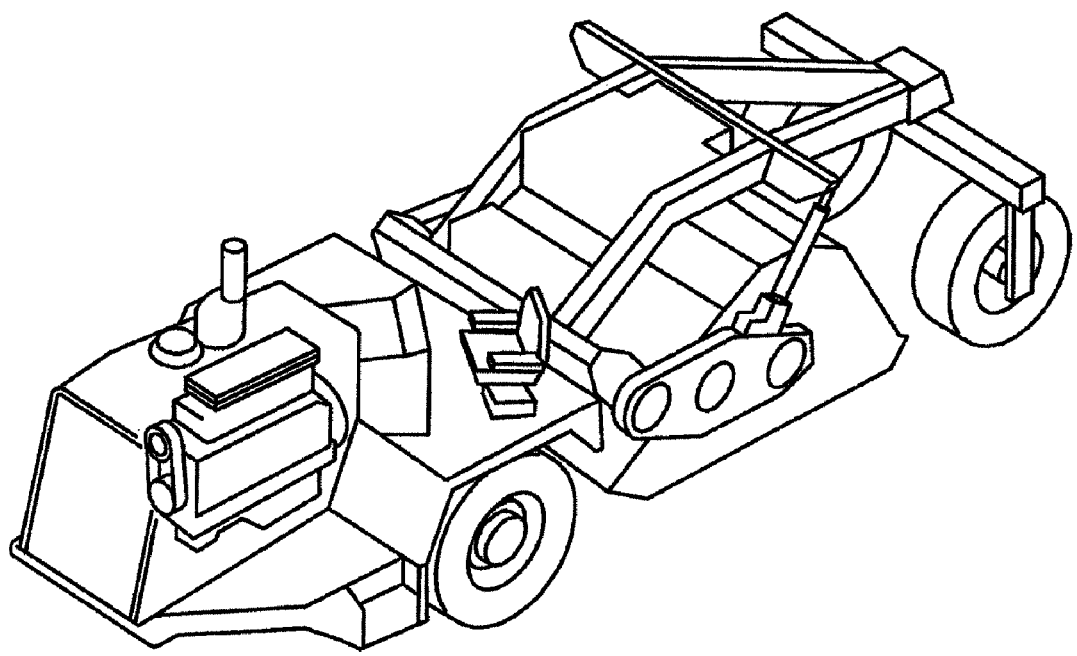
FIG. 3 shows a perspective view of the pulvimixer.

In one embodiment, penetration is dramatically improved by mechanically mixing the chemical composition into soil or road base materials during the application step. The mechanical mixing process can include, but is not limited to, the use of a specialized machine called a "pulvimixer" (shown in FIG. 1). As shown in FIGS. 2 and 3, the pulvimixer mechanically mixes the composition with the soil or road base materials by simultaneously: 1) scarifying the soil or road base materials, which when accomplished by a pulvimixer can additionally include breaking up (pulverizing) large pieces of stone or road topping in a mixing chamber; (2) applying the chemical improvement composition; (3) thoroughly mixing the chemical improvement composition with the pulverized soil or road base material; and (4) grading the treated soil or road base material. This single application phase method prepares the treated soil or road base material—which is now a thoroughly mixed, homogeneous, well-graded roadbed—for leveling and compaction. In some embodiments of the invention, a top coat is then applied to the mechanically mixed and compacted soil or road base materials. In other embodiments, a surface course is applied to the compacted soil or road base materials prior to application of the top coat. A surface course can include any combination of road surface materials used in the art; including, but not limited to, asphalt concrete and bituminous surface treatments such as chip seal.

Effective application amounts of some embodiments can comprise from about 1 liter per cubic meter of soil (i.e. 1 L/m$^3$) to about 10 L/m$^3$, from about 10 L/m$^3$ to about 20 L/m$^3$, from about 20 L/m$^3$ to about 30 L/m$^3$, from about 30 L/m$^3$ to about 40 L/m$^3$, from about 40 L/m$^3$ to about 50 L/m$^3$, from about 50 L/m$^3$ to about 60 L/m$^3$, from about 60 L/m$^3$ to about 70 L/m$^3$, from about 70 L/m$^3$ to about 80 L/m$^3$, from about 80 L/m$^3$ to about 90 L/m$^3$, from about 90 L/m$^3$ to about 100 L/m$^3$, or even greater than 100 L/m$^3$.

The proper application of the chemical compositions for improvement of soil or road base materials of the present invention, particularly using the methodologies described above, greatly improves the load bearing strength of unpaved roads, makes them virtually resistant to the damaging effects of capillary water uptake and water erosion, and provides superior dust retardant properties—under a wider range of effective application and use temperatures—than any composition in the prior art. Moreover, the chemical compositions described and claimed herein can be applied in a single phase to native soils, and due to reduced cure times the result is decreased road construction time, reduced environmental impact (by virtue of reduced construction waste and traffic), and a longer life cycle.

Figure 4:
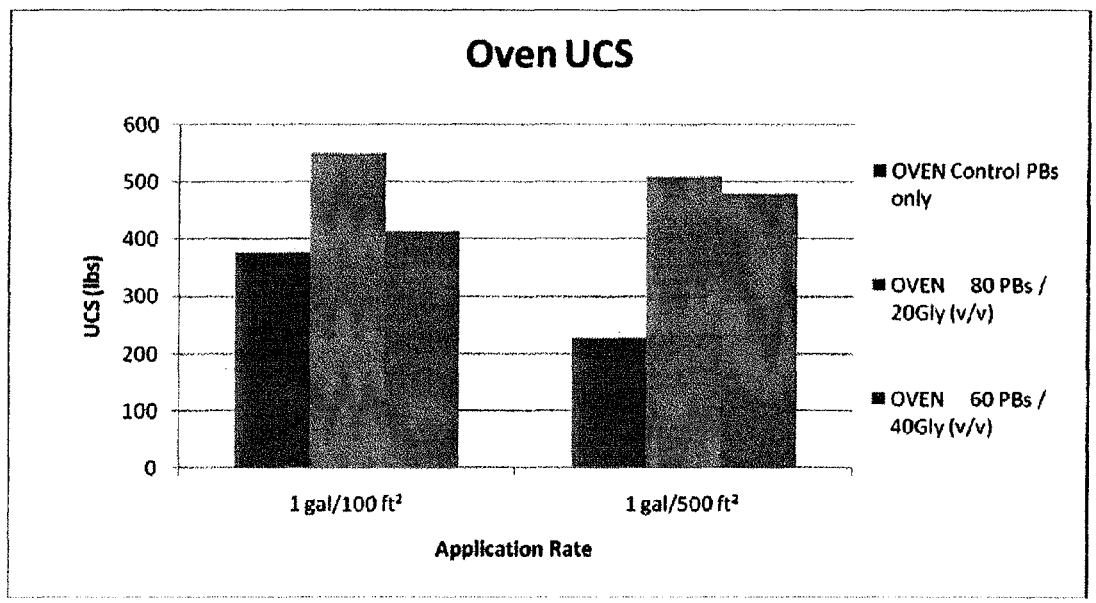
FIG. 4 shows a graph showing unconfined compressive strength (UCS) in an oven.
Figure 5:
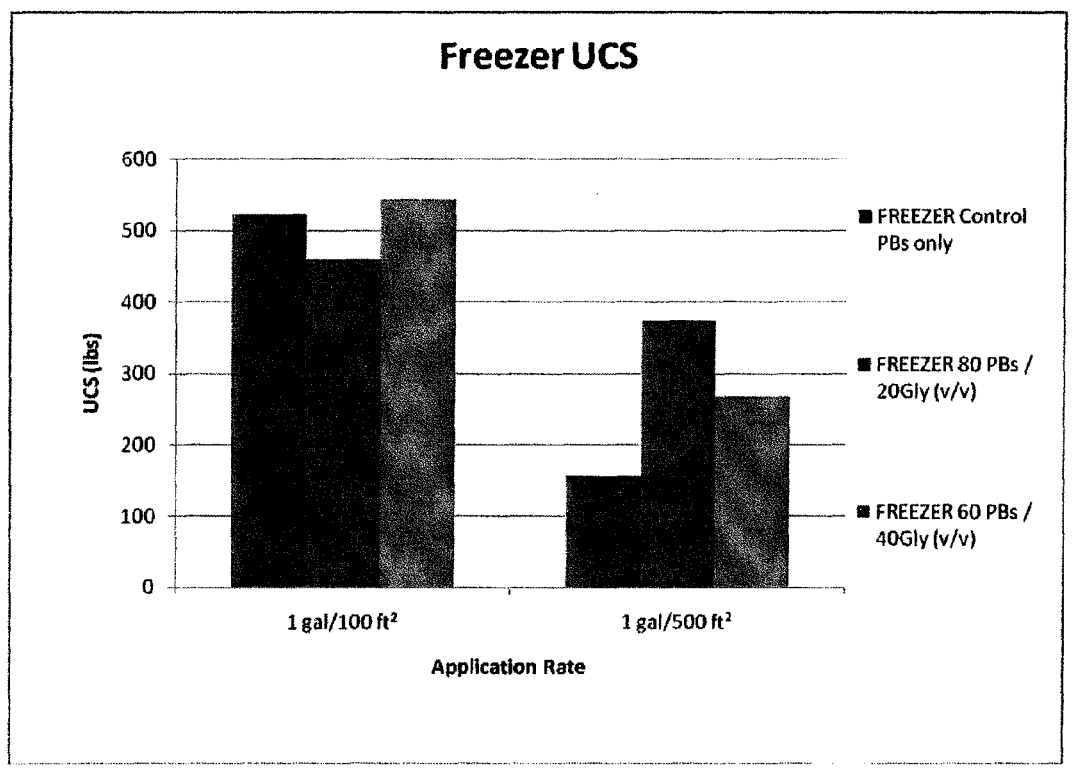
FIG. 5 shows a graph showing UCS in a freezer.
Figure 6:
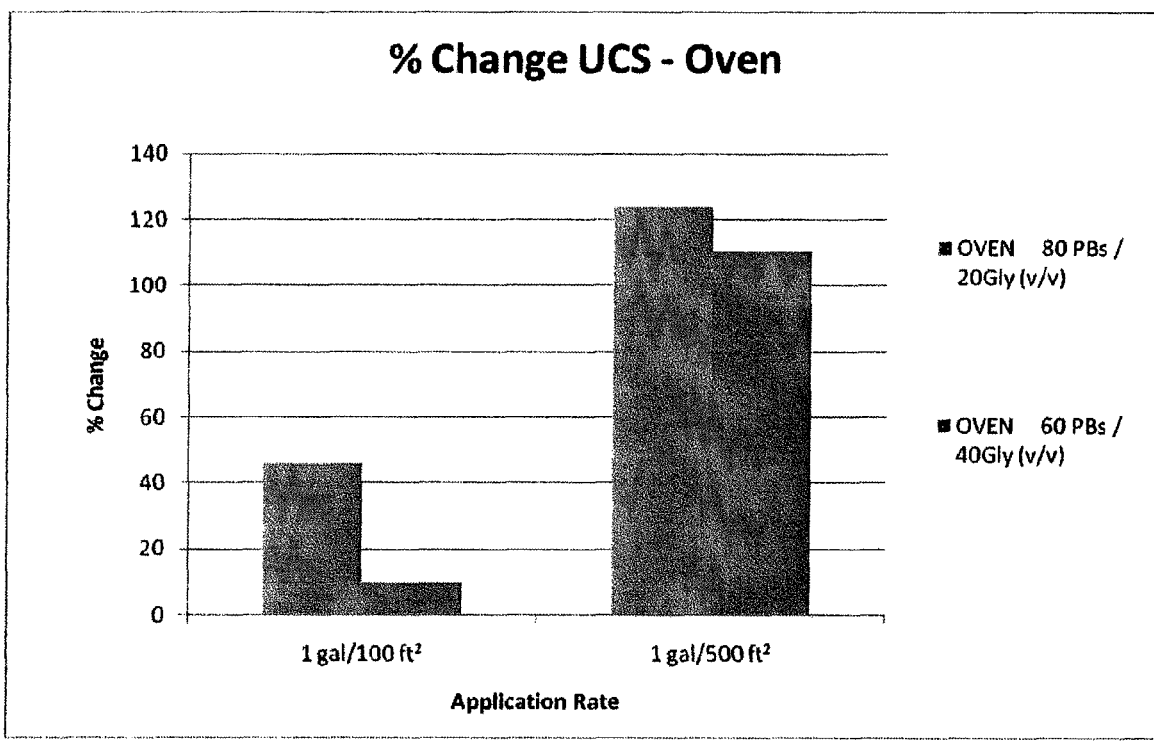
FIG. 6 shows a graph showing % change in UCS in an oven.
Figure 7:
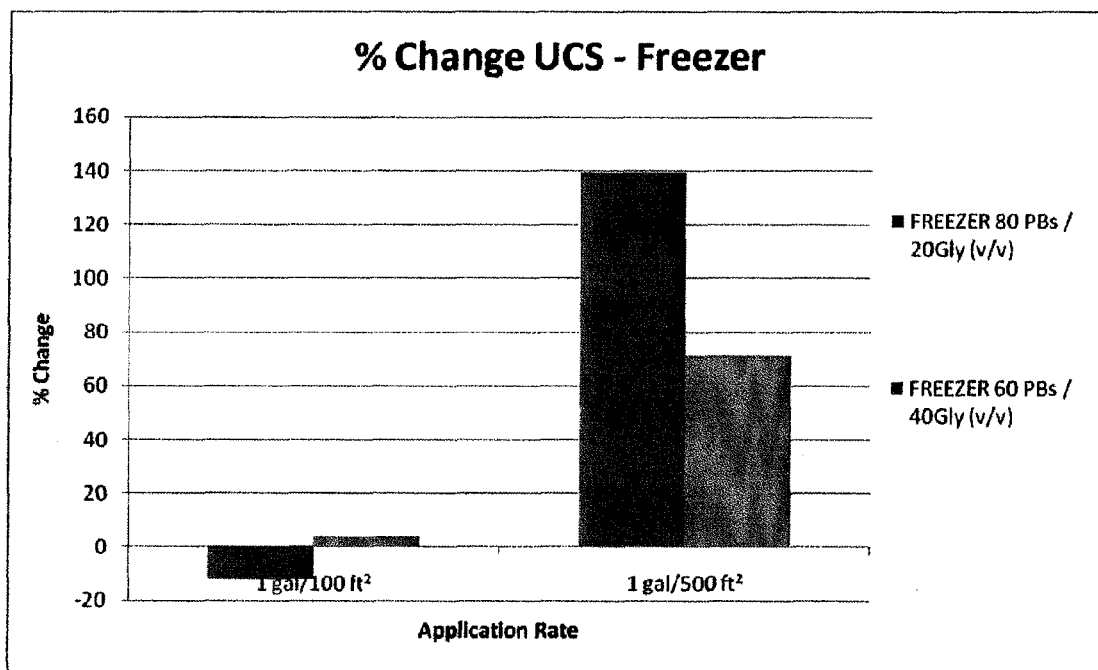
FIG. 7 shows a graph showing % change in UCS in a freezer.

With reference now to FIGS. 4-7, mine tailings (large piles of crushed rock that are left over after the metals of interest like lead, zinc, copper, silver, gold and others, have been extracted from the mineral rocks that contained them) were used for all UCS tests. Standard UCS cores were used with a diameter of 3 inches (7.72 cm) and compacted to a depth of 3 inches (7.62 cm). All application rates were calculated using the surface area of the UCS cores. Dilution was based on optimum moisture of the tailings. Oven samples were prepared and dried in a 104° F. (40° C.) oven for 48 hours. Freezer samples were allowed to acclimate at room temperature for 4 hours then put into a 30° F. (−1.1° C.) freezer for 18 hours. Upon removal from the freezer, the samples were allowed to come to room temperature then dried in a 104° F. (40° C.) oven for 48 hours before breaking. FIGS. 4 and 5 illustrate the differences in UCS of the test samples of polymer and glycerin versus the controls of polymers alone. In both the oven and freezer samples the cores at 1 gal/100 sq. ft. (0.41 L/m$^2$) showed marginal change in UCS versus the controls. However, at a lower application rate the addition of glycerin to the polymer had a more profound effect. FIGS. 6 and 7 show the percentage change in UCS over the control. PBs is acrylic polymer and polyvinyl acetate polymer at about 5% to about 60% by weight and water at about 40% to about 95% by weight with 40% solids. The water used in all samples, test and control, was to bring sample moisture to optimum moisture. So the water level varied depending on the amount of chemical used. The graphs illustrate the effect varying the polymer to glycerin ratio has on the polymer strength. Application rates of 1 gal/100 sq. ft. (0.41 L/m$^2$) and 1 gal/500 sq. ft. (0.082 L/m$^2$) are both shown.

In the following Tables 1-15, results are shown for two of the embodiments of the composition (Biotrol—polymer, glycerin, and 30 to 95% water and Newtrol—polymer, 40 to 99% glycerin, and water). The compositions were applied in three concentrations, 0.4 gallons/sq. yd. (gsy) (1.81 L/m$^2$), 0.8 gsy) (3.62 L/m$^2$), and 1.2 gsy) (5.43 L/m$^2$) to the ground sample. The tables show the various results.

TABLE 1

| 0.4 GSY Dust Pallative Name | Initial Weight, Sample 1 (kg) | Initial Weight, Sample 2 (kg) | Initial Weight, Sample 3 (kg) | Weight after Spraying, Sample 1 (kg) | Weight after Spraying, Sample 2 (kg) | Weight after Spraying, Sample 3 (kg) |
|---|---|---|---|---|---|---|
| Biotrol | 2.68 | 2.68 | 2.672 | 2.716 | 2.722 | 2.714 |
| Newtrol | 2.678 | 2.632 | 2.616 | 2.718 | 2.676 | 2.656 |

TABLE 2

| 0.4 GSY Dust Pallative Name | Weight after Curing, Sample 1 (kg) | Weight after Curing, Sample 2 (kg) | Weight after Curing, Sample 3 (kg) | Optical Max Sample 1 | Optical Max Sample 2 | Optical Max Sample 3 |
|---|---|---|---|---|---|---|
| Biotrol | 2.682 | 2.682 | 2.672 | 39.14 | 32.64 | 33.2 |
| Newtrol | 2.694 | 2.66 | 2.632 | 30.86 | 52.48 | 87.89 |

TABLE 3

| 0.4 GSY Dust Pallative Name | Weight after Blowing, Sample 1 (kg) | Weight after Blowing, Sample 2 (kg) | Weight after Blowing, Sample 3 (kg) | Min Crust, Sample 1 (in.) | Min Crust, Sample 2 (in.) | Min Crust, Sample 3 (in.) |
|---|---|---|---|---|---|---|
| Biotrol | 2.662 | 2.66 | 2.654 | 0.28 | 0.28 | 0.3 |
| Newtrol | 2.576 | 2.054 | 1.698 | 0.32 | 0.46 | 0.31 |

TABLE 4

| 0.4 GSY Dust Pallative Name | Max Crust, Sample 1 (in.) | Max Crust, Sample 2 (in.) | Max Crust, Sample 3 (in.) | Weight Loss, Sample 1 (grams) | Weight Loss, Sample 2 (grams) | Weight Loss, Sample 3 (grams) |
|---|---|---|---|---|---|---|
| Biotrol | 0.4 | 0.73 | 0.56 | 20 | 22 | 18 |
| Newtrol | 0.58 | 0.92 | 0.46 | 118 | 606 | 934 |

TABLE 5

| 0.4 GSY Dust Pallative Name | Average Weight Loss | Stdev Weight Loss | Average Max Crust Depth | Stdev Max Crust Depth | Average Optical | Stdev Optical |
|---|---|---|---|---|---|---|
| Biotrol | 20.00 | 2.00 | 0.56 | 0.17 | 34.99 | 3.60 |
| Newtrol | 552.67 | 410.61 | 0.65 | 0.24 | 57.07 | 28.79 |

TABLE 6

| 0.8 GSY Dust Pallative Name | Initial Weight, Sample 1 (kg) | Initial Weight, Sample 2 (kg) | Initial Weight, Sample 3 (kg) | Weight after Spraying, Sample 1 (kg) | Weight after Spraying, Sample 2 (kg) | Weight after Spraying, Sample 3 (kg) |
|---|---|---|---|---|---|---|
| Biotrol | 2.684 | 2.676 | 2.696 | 2.744 | 2.742 | 2.762 |
| Newtrol | 2.658 | 2.624 | 2.582 | 2.732 | 2.702 | 2.64 |

TABLE 7

| 0.8 GSY Dust Pallative Name | Weight after Curing, Sample 1 (kg) | Weight after Curing, Sample 2 (kg) | Weight after Curing, Sample 3 (kg) | Optical Max Sample 1 | Optical Max Sample 2 | Optical Max Sample 3 |
|---|---|---|---|---|---|---|
| Biotrol | 2.678 | 2.682 | 2.696 | 29.13 | 34.63 | 32.7 |
| Newtrol | 2.7 | 2.67 | 2.614 | 169.55 | 35.91 | 34.43 |

TABLE 8

| 0.8 GSY Dust Pallative Name | Weight after Blowing, Sample 1 (kg) | Weight after Blowing, Sample 2 (kg) | Weight after Blowing, Sample 3 (kg) | Min Crust, Sample 1 (in.) | Min Crust, Sample 2 (in.) | Min Crust, Sample 3 (in.) |
|---|---|---|---|---|---|---|
| Biotrol | 2.678 | 2.668 | 2.694 | 0.61 | 0.26 | 0.29 |
| Newtrol | 2.66 | 2.62 | 2.57 | 0.57 | 0.47 | 0.37 |

TABLE 9

| 0.8 GSY Dust Pallative Name | Max Crust, Sample 1 (in.) | Max Crust, Sample 2 (in.) | Max Crust, Sample 3 (in.) | Weight Loss, Sample 1 (grams) | Weight Loss, Sample 2 (grams) | Weight Loss, Sample 3 (grams) |
|---|---|---|---|---|---|---|
| Biotrol | 1.15 | 0.9 | 1.01 | 0 | 14 | 2 |
| Newtrol | 0.86 | 0.76 | 0.7 | 40 | 50 | 44 |

TABLE 10

| 0.8 GSY Dust Pallative Name | Average Weight Loss | Stdev Weight Loss | Average Max Crust Depth | Stdev Max Crust Depth | Average Optical | Stdev Optical |
|---|---|---|---|---|---|---|
| Biotrol | 5.33 | 7.57 | 1.02 | 0.13 | 32.153333 | 2.790454 |
| Newtrol | 44.67 | 5.03 | 0.77 | 0.08 | 79.963333 | 77.587858 |

TABLE 11

| 1.2 GSY Dust Pallative Name | Initial Weight, Sample 1 (kg) | Initial Weight, Sample 2 (kg) | Initial Weight, Sample 3 (kg) | Weight after Spraying, Sample 1 (kg) | Weight after Spraying, Sample 2 (kg) | Weight after Spraying, Sample 3 (kg) |
|---|---|---|---|---|---|---|
| Biotrol | 2.68 | 2.666 | 2.678 | 2.756 | 2.756 | 2.758 |
| Newtrol | 2.642 | 2.632 | 2.632 | 2.724 | 2.73 | 2.708 |

TABLE 12

| 1.2 GSY Dust Pallative Name | Weight after Curing, Sample 1 (kg) | Weight after Curing, Sample 2 (kg) | Weight after Curing, Sample 3 (kg) | Optical Max Sample 1 | Optical Max Sample 2 | Optical Max Sample 3 |
|---|---|---|---|---|---|---|
| Biotrol | 2.68 | 2.678 | 2.686 | 35.29 | 28.22 | 28.12 |
| Newtrol | 2.698 | 2.712 | 2.666 | 32.89 | 32.7 | 26.53 |

TABLE 13

| 1.2 GSY Dust Pallative Name | Weight after Blowing, Sample 1 (kg) | Weight after Blowing, Sample 2 (kg) | Weight after Blowing, Sample 3 (kg) | Min Crust, Sample 1 (in.) | Min Crust, Sample 2 (in.) | Min Crust, Sample 3 (in.) |
|---|---|---|---|---|---|---|
| Biotrol | 2.67 | 2.664 | 2.66 | 0.72 | 0.8 | 0.85 |
| Newtrol | 2.664 | 2.674 | 2.64 | 0.41 | 0.75 | 0.71 |

TABLE 14

| 1.2 GSY Dust Pallative Name | Max Crust, Sample 1 (in.) | Max Crust, Sample 2 (in.) | Max Crust, Sample 3 (in.) | Weight Loss, Sample 1 (grams) | Weight Loss, Sample 2 (grams) | Weight Loss, Sample 3 (grams) |
|---|---|---|---|---|---|---|
| Biotrol | 1.01 | 1.25 | 1.1 | 10 | 14 | 26 |
| Newtrol | 0.8 | 1.25 | 1.2 | 34 | 38 | 26 |

TABLE 15

| 1.2 GSY Dust Pallative Name | Average Weight Loss | Stdev Weight Loss | Average Max Crust Depth | Stdev Max Crust Depth | Average Optical | Stdev Optical |
|---|---|---|---|---|---|---|
| Biotrol | 16.67 | 8.33 | 1.12 | 0.12 | 30.543333 | 4.111038 |
| Newtrol | 32.67 | 6.11 | 1.08 | 0.25 | 30.706667 | 3.6183468 |

In another embodiment, the composition includes a superabsorbent polymer, water, and glycerin. The superabsorbent polymers are chosen from the group comprising polymerized acrylic amide (PAM), polyacrylate, PAM/polyacrylate copolymer linear, and PAM/polyacrylate copolymer crosslinked. In one embodiment, the superabsorbent polymer is about 0.1% to about 25% by weight (including, but not limited to, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 11, 12, 13, 14, 15, 16, 17, 18, 19, 20, 21, 22, 23, 24, and 25), the water is about 0% to about 99.9% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99.0, 99.1, 99.2, 99.3, 99.4, 99.5, 99.6, 99.7, 99.8, and 99.9), and the glycerin is about 0% to about 60% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60). In one embodiment, the superabsorbent polymer is PAM/polyacrylate copolymer linear, and the composition is about 3% to about 7% (including, but not limited to, 3, 4, 5, 6, and 7) by weight polymer, about 37% to about 39% (including, but not limited to, 37, 38, and 39) by weight water, and about 56% to about 58% (including, but not limited to, 56, 57, and 58) by weight glycerin.

In another embodiment, the composition is a superabsorbent polymer and water, wherein the polymer is about 0.1% to about 25% (including, but not limited to, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 11, 12, 13, 14, 15, 16, 17, 18, 19, 20, 21, 22, 23, 24, and 25) by weight and the water is about 75% to about 99.9% (including, but not limited to, 75, 76, 77, 78, 79, 80, 81, 82, 83, 84, 85, 86, 87, 88, 89, 90, 91, 92, 93, 94, 95, 96, 97, 98, 99.0, 99.1, 99.2, 99.3, 99.4, 99.5, 99.6, 99.7, 99.8, and 99.9) by weight.

In another embodiment, the composition is a superabsorbent polymer, water, glycerin, and acrylic polymer/polyvinyl acetate polymer emulsion, wherein the polymer is about 0.1% to about 15% (including, but not limited to, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 11, 12, 13, 14, and 15) by weight, the water is about 0% to about 40% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40), the glycerin is about 0% to about 60% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60), and the emulsion is about 0% to about 40% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40).

In another embodiment, the composition is a superabsorbent polymer, water, and acrylic polymer/polyvinyl acetate polymer emulsion, wherein the polymer is about 0.1% to about 15% (including, but not limited to, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 11, 12, 13, 14, and 15) by weight, the water is about 0% to about 60% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60), and the emulsion is about 0% to about 40% by weight (including, but not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40).

In another embodiment, wherein the temperature is above freezing, any of the compositions in the above four paragraphs can be mixed with an aqueous solution of a water repellant that comprises about 1.0% to about 5.0% by weight (including, but not limited to, 1, 2, 3, 4, and 5) of potassium hydroxide; about 10.0% to about 30.0% by weight (including, but not limited to, 10, 11, 12, 13, 14, 15, 16, 17, 18, 19, 20, 21, 22, 23, 24, 25, 26, 27, 28, 29, and 30) of potassium methylsiliconate; and about 65.0% to about 89.0% by weight (including, but not limited to, 65, 66, 67, 68, 69, 70, 71, 72, 73, 74, 75, 76, 77, 78, 79, 80, 81, 82, 83, 84, 85, 86, 87, 88, and 89) of water. In yet another embodiment of the invention, instead of the aforementioned potassium methylsiliconate, the aqueous solution of a water repellant comprises about 10.0% to about 30.0% by weight (including, but not limited to, 10, 11, 12, 13, 14, 15, 16, 17, 18, 19, 20, 21, 22, 23, 24, 25, 26, 27, 28, 29, and 30) of sodium methylsiliconate.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. "Approximately" and "about" are used interchangeably and have the same meaning. The use of "approximately 0%" and "about 0%" is intended to mean an amount greater than 0.

We claim:
1. A composition for dust suppression, the composition comprising:
   an acrylic polymer;
   a polyvinyl acetate polymer, wherein the acrylic polymer/polyvinyl acetate polymer is between about 1.25% and about 45% by weight;

a water repellant comprising:
  water, wherein the water is between about 46.25% and about 93.5%;
  potassium hydroxide, wherein the potassium hydroxide is between 0.25% and 5% by weight;
  a methylsiliconate, wherein the methylsiliconate is between about 2.5% and about 30% by weight; and,
  glycerin, wherein the glycerin is between about 0% and about 50% by weight, wherein the polymers, glycerin, and water form an aqueous acrylic vinyl acetate polymer emulsion.

2. The composition of claim 1, wherein the acrylic polymer/polyvinyl acetate polymer is between about 1.25% and about 15% by weight, the potassium hydroxide is between about 0.75% and about 3.75% by weight, the methylsiliconate is between about 7.5% and about 22.5% by weight, and the water is between about 58.75% and about 90.5% by weight.

3. The composition of claim 1, wherein the acrylic polymer/polyvinyl acetate polymer is between about 2.5% and about 30% by weight, the potassium hydroxide is between about 0.5% and about 2.5% by weight, and the methylsiliconate is between about 5% and about 15% by weight.

4. The composition of claim 1, wherein the acrylic polymer/polyvinyl acetate polymer is between about 3.75% and about 45% by weight, the potassium hydroxide is between about 0.25% and about 1.25% by weight, the methylsiliconate is between about 2.5% and about 7.5% by weight, and the water is between about 46.25% and about 93.5% by weight.

5. The composition of claim 1, wherein the composition further comprises an emulsifier.

6. The composition of claim 5, wherein the acrylic polymer and polyvinyl acetate polymer comprise a mixture of homopolymers.

7. The composition of claim 6, wherein the acrylic polymer and polyvinyl acetate polymer homopolymers are present in ratios from about 1:1 to about 1:10,000 by mass of acrylic polymer to polyvinyl acetate polymer.

8. The composition of claim 6, wherein the acrylic polymer and polyvinyl acetate polymer homopolymers are present in ratios from about 1:1 to about 1:10,000 by mass of polyvinyl acetate polymer to acrylic polymer.

9. The composition of claim 5, wherein the acrylic polymer and polyvinyl acetate polymer comprise a blend of copolymers.

10. The composition of claim 1, wherein the methylsiliconate is either potassium methylsiliconate or sodium methylsiliconate.

11. The composition of claim 1, wherein the polymers have molecular weights of between about $10^3$ g/mol to about $10^{10}$ g/mol.

12. The composition of claim 11, wherein the polymers have molecular weights of between about $10^3$ g/mol to about $10^4$ g/mol.

13. The composition of claim 11, wherein the polymers have molecular weights of between about $10^4$ g/mol to about $10^5$ g/mol.

14. The composition of claim 11, wherein the po s have molecular weights of between about $10^5$ g/mol to about $10^6$ g/mol.

15. The composition of claim 11, wherein the polymers have molecular weights of between about $10^6$ g/mol to about $10^7$ g/mol.

16. The composition of claim 11, wherein the polymers have molecular weights of between about $10^7$ g/mol to about $10^8$ g/mol.

17. The composition of claim 11, wherein the polymers have molecular weights of between about $10^8$ g/mol to about $10^9$ g/mol.

18. The composition of claim 11, wherein the polymers have molecular weights of between about $10^9$ g/mol to about $10^{10}$ g/mol.

* * * * *